US008782172B2

(12) United States Patent
Kim et al.

(10) Patent No.: US 8,782,172 B2
(45) Date of Patent: Jul. 15, 2014

(54) METHOD OF CONTROLLING MOBILE TERMINAL, HOME HUB, AND VISITED HUB IN VIRTUAL GROUP FOR CONTENT SHARING

(75) Inventors: Jae Hoon Kim, Yongin-si (KR); Byoung Joon Lee, Seongnam-si (KR); Myeong Wuk Jang, Seoul (KR); Ji Hoon Lee, Anyang-si (KR); Do Jun Byun, Goyang-si (KR); Joong Hong Park, Seoul (KR); Sung Chan Choi, Uijeongbu-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 839 days.

(21) Appl. No.: 12/983,033

(22) Filed: Dec. 31, 2010

(65) Prior Publication Data

US 2011/0289193 A1    Nov. 24, 2011

(30) Foreign Application Priority Data

May 20, 2010    (KR) .................. 10-2010-0047339

(51) Int. Cl.
*G06F 15/16*    (2006.01)
*H04W 88/08*    (2009.01)

(52) U.S. Cl.
USPC .......................................... 709/219; 370/328

(58) Field of Classification Search
None
See application file for complete search history.

(56) References Cited

U.S. PATENT DOCUMENTS

| 6,085,238 | A * | 7/2000 | Yuasa et al. .................. 709/223 |
| 6,795,857 | B1 * | 9/2004 | Leung et al. ................. 709/224 |
| 7,216,159 | B2 * | 5/2007 | Hirose et al. ................. 709/223 |
| 2002/0136226 | A1 | 9/2002 | Christoffel et al. |
| 2004/0098507 | A1 | 5/2004 | Thubert et al. |
| 2004/0172480 | A1 * | 9/2004 | Hirose et al. ................. 709/238 |
| 2005/0085258 | A1 * | 4/2005 | Ishii et al. .................. 455/552.1 |
| 2005/0105491 | A1 * | 5/2005 | Chaskar et al. ............. 370/331 |
| 2006/0268834 | A1 * | 11/2006 | Bajic ........................... 370/352 |
| 2006/0274695 | A1 * | 12/2006 | Krishnamurthi et al. ..... 370/331 |
| 2008/0146230 | A1 * | 6/2008 | Pandian et al. .............. 455/436 |
| 2009/0042557 | A1 * | 2/2009 | Vardi et al. ................. 455/422.1 |
| 2009/0049164 | A1 * | 2/2009 | Mizuno ........................ 709/223 |
| 2009/0100514 | A1 * | 4/2009 | Jin et al. ......................... 726/15 |

(Continued)

FOREIGN PATENT DOCUMENTS

| EP | 1 531 645 A1 * | 5/2005 |
| EP | 1 959 635 A2 | 8/2008 |

(Continued)

OTHER PUBLICATIONS

Extended European Search Report issued on Feb. 7, 2012, in counterpart European Patent Application No. 11152320.5 (in English, 6 pages).

*Primary Examiner* — Venkat Perungavoor
*Assistant Examiner* — Christopher Ruprecht
(74) *Attorney, Agent, or Firm* — NSIP Law

(57) ABSTRACT

Provided is a method of controlling a home hub in a virtual group that may provide a geographical boundary about the virtual group by associating an identifier of a network of a virtual group included in an access point list with a name of the virtual group and a name of the home hub managing the virtual group, and may provide a terminal which moves to a visited virtual group with information about a network of the visited virtual group, thereby facilitating recognition of a virtual group and content sharing.

20 Claims, 7 Drawing Sheets

(56) References Cited

U.S. PATENT DOCUMENTS

| | | | |
|---|---|---|---|
| 2009/0124284 A1* | 5/2009 | Scherzer et al. | 455/552.1 |
| 2009/0282251 A1* | 11/2009 | Cook et al. | 713/171 |
| 2009/0310535 A1* | 12/2009 | Anumala et al. | 370/328 |
| 2010/0017601 A1* | 1/2010 | Falk et al. | 713/168 |
| 2010/0020746 A1* | 1/2010 | Zaks | 370/328 |
| 2010/0085920 A1* | 4/2010 | Chari et al. | 370/328 |
| 2010/0234022 A1* | 9/2010 | Winterbottom | 455/433 |
| 2010/0281249 A1* | 11/2010 | Das et al. | 713/151 |
| 2010/0284368 A1* | 11/2010 | Haddad et al. | 370/331 |
| 2011/0013566 A1* | 1/2011 | Aso et al. | 370/328 |
| 2011/0013569 A1* | 1/2011 | Scherzer et al. | 370/329 |

FOREIGN PATENT DOCUMENTS

| | | |
|---|---|---|
| EP | 1618709 B1 * | 6/2010 |
| GB | 2 434 940 A | 8/2007 |
| JP | 2008-244945 | 10/2008 |
| JP | 2009-182564 | 8/2009 |
| JP | 2009-182893 | 8/2009 |
| KR | 10-2009-0044740 | 5/2009 |

* cited by examiner

FIG. 3

| NAME OF HOME VIRTUAL GROUP | HOME HUB LIST | | ACCESS POINT LIST | | |
|---|---|---|---|---|---|
| | NAME 307 | IP ADDRESS 309 | NAME (SSID) 311 | | ID 313 |
| MyHome | MyHome_Hub1 | 10.0.0.1 | MyHome_Hub1_AP_1 | | MAC ADDRESS |
| | | | MyHome_Hub1_AP_2 | | MAC ADDRESS |

301, 303, 305

METHOD OF CONTROLLING MOBILE TERMINAL, HOME HUB, AND VISITED HUB IN VIRTUAL GROUP FOR CONTENT SHARING

CROSS-REFERENCE TO RELATED APPLICATION(S)

This application claims the benefit under 35 U.S.C. §119(a) of Korean Patent Application No. 10-2010-0047339, filed on May 20, 2010, in the Korean Intellectual Property Office, the entire disclosure of which is incorporated herein by reference for all purposes.

BACKGROUND

1. Field

The following description relates to a method of controlling a mobile terminal, a home hub, and a visited hub, and more particularly, to a method of controlling a terminal, a home hub, and a visited hub in a virtual group for content sharing.

2. Description of Related Art

Contents may be shared smoothly and conveniently between devices of group members or other virtual groups when a content sharing service is provided between devices of group members configuring each virtual group.

SUMMARY

The following description relates to a method of controlling hubs of virtual groups to share network information about the virtual groups so that a terminal moving into a visited virtual group may share content with a terminal or other device in the visited virtual group.

The foregoing and/or other features and aspects may be achieved by providing a method of controlling a home hub in a virtual group for content sharing, the method including receiving, from a terminal moving to a visited virtual group, a request for information about a network of the visited virtual group including a visited hub that manages the visited virtual group, transmitting information about the network of the visited virtual group to the terminal in response to the request, receiving, from the terminal, information about the visited virtual group in response to the terminal being temporarily registered in the visited virtual group using information about the network of the visited virtual group, and updating a hub list table configured in advance using the information about the visited virtual group.

The network of the visited virtual group may include the visited hub and at least one access point managed by the visited hub, and information about the network of the visited virtual group may include information about the visited hub and information about the at least one access point managed by the visited hub.

The method may further include performing an association with the terminal connected to a network of a home virtual group, and acquiring an identifier of the network of the home virtual group from the terminal.

The method may further include configuring an access point list including at least one access point belonging to the network of the home virtual group, using the identifier of the network of the home virtual group.

The method may further include exchanging an access point list including at least one access point belonging to the network of the visited virtual group managed by the visited hub, with the access point list including the at least one access point belonging to the network of the home virtual group managed by the home hub, and configuring the hub list table based on the access point list about the at least one access point belonging to the network of the visited virtual group acquired through the exchanging.

The configuring of the hub list table may include associating the identifier of the network of the home virtual group included in the access point list belonging to the network of the home virtual group with a name of the home virtual group and a name of the home hub managing the home virtual group, so as to provide a geographical boundary about the home virtual group.

The access point list belonging to the network of the home virtual group may include a name of the home virtual group, a name and an Internet Protocol (IP) address of the home hub managing the home virtual group, a Service Set Identifier (SSID) and a Media Access Control (MAC) address of at least one access point managed by the home hub, a name of content belonging to the at least one access point, and information about the geographical location of the home hub.

The hub list table may include a name of the home virtual group, a home hub list including the home hub managing the home virtual group, and an access point list including at least one access point managed by the home hub, the home hub list may include a name of the home hub and an IP address of the home hub, and the access point list may include an SSID and a MAC address of the at least one access point managed by the home hub.

The method may further include informing the terminal of a content request in response to the content request being received from other virtual groups excluding the visited virtual group, the content request being about the terminal.

The foregoing and/or other features and aspects may also be achieved by providing a method of controlling a terminal in a virtual group for content sharing, the method including requesting a home hub for information about a network of a visited virtual group including a visited hub which manages the visited virtual group to which the terminal has moved, the home hub managing a home virtual group, configuring a mapping table using information about the network of the visited virtual group received in response to the request, performing a temporary registration in the visited virtual group based on the mapping table, and sharing content with the visited hub.

The method may further include transmitting information about the visited virtual group to the home hub.

The method may further include acquiring an identifier of the network of the home virtual group from the network of the home virtual group, performing an association with the home hub, and transmitting the identifier of the network of the home virtual group to the home hub.

The method may further include requesting the home hub for information about the network of the visited virtual group in response to information about the network of the visited virtual group not existing on the mapping table.

The foregoing and/or other features and aspects may also be achieved by providing a method of controlling a visited hub in a virtual group for content sharing, the method comprising performing a temporary registration for a terminal having been moved to a visited virtual group, and sharing content with the temporarily registered terminal.

The method may further include exchanging an access point list including at least one access point belonging to a network of a home virtual group managed by a home hub located outside the visited virtual group, with an access point list including at least one access point belonging to a network of the visited virtual group managed by the visited hub, and configuring a hub list table based on the access point list belonging to the network of the home virtual group acquired through the exchanging.

The hub list table may include a name of the visited virtual group, a visited hub list including the visited hub which manages the home virtual group, and an access point list including the at least one access point managed by the visited hub, the visited hub list may include a name of the visited hub and an IP address of the visited hub, and the access point list may include an SSID and a MAC address of the at least one access point managed by the visited hub.

According to an aspect, a networking technology based on content rather than an IP-based Internet structure may be used, thereby enabling a consistent content sharing and transmission in a case in which content moves.

According to an aspect, dependence on a server may be reduced by configuring a user-oriented virtual group.

According to an aspect, it is possible to prevent a message for retrieving data from being transferred via multiple hops by associating a name (SSID) of an access point of a virtual group with a name of the virtual group and a name of a hub which manages the virtual group, and by providing a geographical boundary.

According to an aspect, it is possible to provide an optimum path for data transmission and content sharing by associating a name (SSID) of an access point of a virtual group with a name of the virtual group and a name of a hub which manages the virtual group, and by providing a geographical boundary.

According to an aspect, in a case in which content moves, it is possible to provide effective routing by forwarding a traffic transmitted to a terminal to a visited group using information about a network of a visited virtual group provided by the terminal which has moved to the visited virtual group.

Other features and aspects will be apparent from the following detailed description, the drawings, and the claims.

BRIEF DESCRIPTION OF THE DRAWINGS

These and/or other aspects will become apparent and more readily appreciated from the following description of various example embodiments, taken in conjunction with the accompanying drawings briefly described below.

FIG. 3 is a diagram illustrating a hub list table according to an example embodiment.

Figure 1:
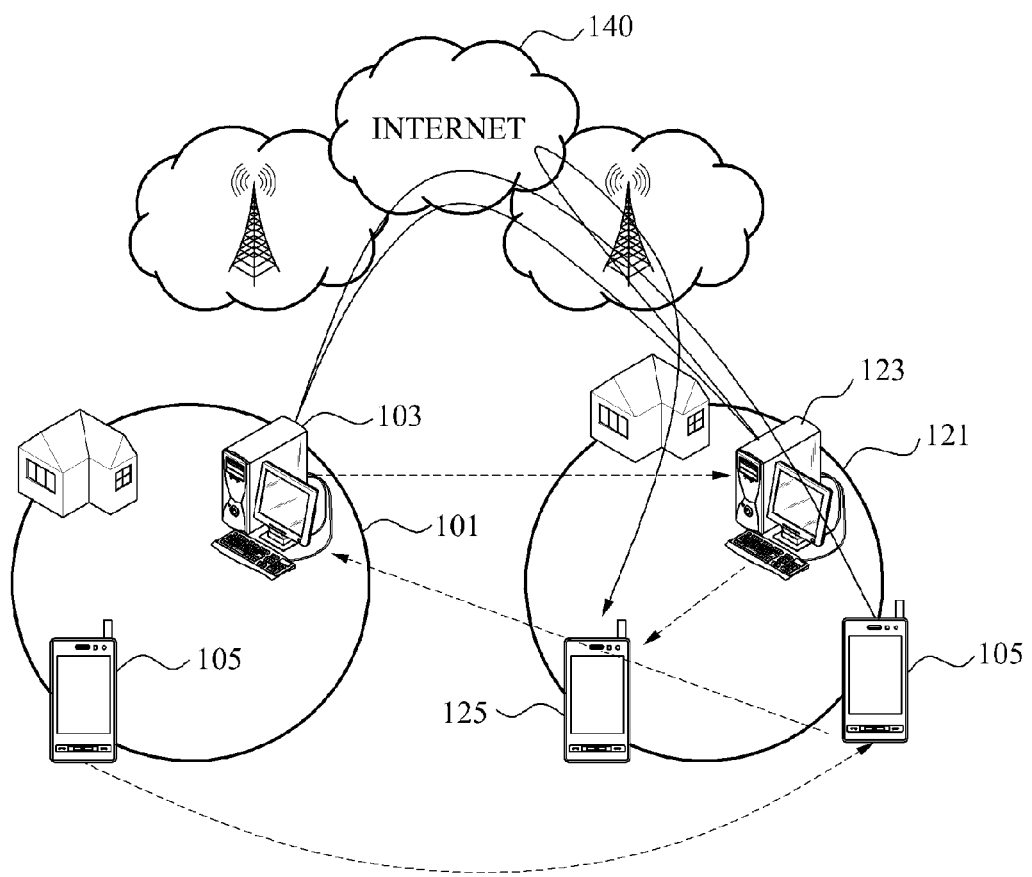
FIG. 1 is a diagram illustrating a flow of a data request between virtual groups in a case in which a terminal is moved according to a related art.

Throughout the drawings and the detailed description, unless otherwise described, the same drawing reference numerals will be understood to refer to the same elements, features, and structures. The relative size and depiction of these elements may be exaggerated for to clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing operations described is an example; however, the sequence of operations is not limited to that set forth herein and may be changed as is known in the art, with the exception of operations necessarily occurring in a certain order. Also, description of well-known functions and constructions may be omitted for increased clarity and conciseness.

FIG. 1 illustrates a flow of a data request between virtual groups when a terminal is moved according to a related art.

In the following description of various example embodiments, the terms "home" and "visited" are used to differentiate between a home virtual group, which includes components (home components) belonging to or registered with that home virtual group, and a visited virtual group, which includes components (visited components) belonging to or registered with that visited virtual group. Thus, for example, a component registered with a home virtual group may move to visit a visited virtual group, and may, as a further example, communicate with a visited hub, which is a hub of the visited group. In other words, the term "visited hub" may not necessarily indicate that the visited hub itself is visited by a components registered with the home group, but rather that the visited hub is a part of the virtual group being visited, i.e., the visited virtual group.

FIG. 1 illustrates a flow of a data request between a home hub 103 of a home virtual group 101 and a visited hub 123 of a visited virtual group 121 in a case in which a terminal 105 belonging to the home virtual group 101 visits the visited virtual group 121 to share content with a terminal 125 registered in the visited virtual group 121, or with the visited hub 123.

Referring to FIG. 1, the home virtual group 101 and the visited virtual group 121 may transmit and receive the data request using various schemes. A solid arrow indicator in FIG. 1 indicates that the home virtual group 101 and the visited virtual group 121 transmit and receive the data request using one of the schemes. A dotted arrow indicator in FIG. 1 indicates that the home virtual group 101 and the visited virtual group 121 transmit and receive the data request using another scheme.

According to the flow of the data request indicated by the solid arrow indicator, the data request from the terminal 105 visiting the visited virtual group 121 may be transferred, for example, through the home hub 103, the visited hub 123, and a repeater, to the terminal 125 registered in the visited virtual group 121.

According to the flow of the data request indicated by the solid arrow indicator, in a case in which the terminal 105 moves to another virtual group (not illustrated), the data request from the terminal 105 may be transferred via a plurality of hops, increasing a loss of a wireless resource.

The dotted arrow indicator indicates that the home virtual group 101 and the visited virtual group 121 transmit and receive the data request using another scheme.

According to the dotted arrow indicator, the data request may be transmitted via tunneling. Accordingly, the home virtual group 101 and the visited virtual group 121 may efficiently share content with a small loss of a wireless resource.

A virtual group considered according to an example embodiment corresponds to a virtual group of an overlay concept. Therefore, an area of the virtual group may be different from an area of a general Internet Protocol (IP) subnet. The virtual group may include a plurality of IP subnets. A communicational environment of a device included in the virtual group may be configured only by a cellular communication.

In such a communicational environment as that described above, a transmission coverage of an advertisement message of a general hub may be constrained within an IP subnet. Thus, although the transmission coverage is within a single virtual group, in a case in which the IP subnets are different from each other, the advertisement message of the hub transmitted using an IP broadcast within the single virtual group may not be transferred properly.

The virtual group may include various types of devices. The devices may include various communication devices with a networking function, for example, a cellular type terminal, a terminal supporting a wireless fidelity (WiFi) wireless protocol and the like, a cellular type access point, a WiFi wireless protocol type access point, and the like.

The virtual group may be represented by a hub of the virtual group, and may be managed by the hub.

The hub of the virtual group may function as a path between the corresponding virtual group and another virtual group. For example, a hub of a particular virtual group may provide a connection with another virtual group, thereby providing a content sharing service.

A hub of each virtual group may verify information about a network of the corresponding virtual group such as a terminal, an access point, and the like belonging to the virtual group. The hub of each virtual group may share various types of information, for example, an access point list and the like, about the network of the virtual group with a hub of another virtual group not managed by the information sharing hub. The virtual groups may use the various types of information about the network of the respective virtual groups for sharing content with each other.

Information exchanged between hubs may include, for example, a name of each virtual group, a name and an IP address of the respective hub managing each virtual group, a Service Set Identifier (SSID) and a Media Access Control (MAC) address of at least one to access point belonging to the hub sharing the information, a name of content belonging to the at least one access point, and the like.

The information exchanged between the hubs may also include information about a geographical location of each hub and information about a communication environment associated with the each hub. A geographical boundary of the virtual group may be provided by exchanging the above information.

According to an example embodiment, each hub may associate an identifier of the network of the virtual group with a name of the virtual group and a name of a hub managing the virtual group.

For example, each hub may map an SSID of the access point which constructs a wireless environment in the virtual group with a name of the virtual group and a name of the hub managing the virtual group, thereby associating the SSID of the access point with the virtual group. Accordingly, devices within the virtual group may be mapped to a geographical location of each virtual group and may easily recognize a visited virtual group to which a terminal is moved.

Figure 2:
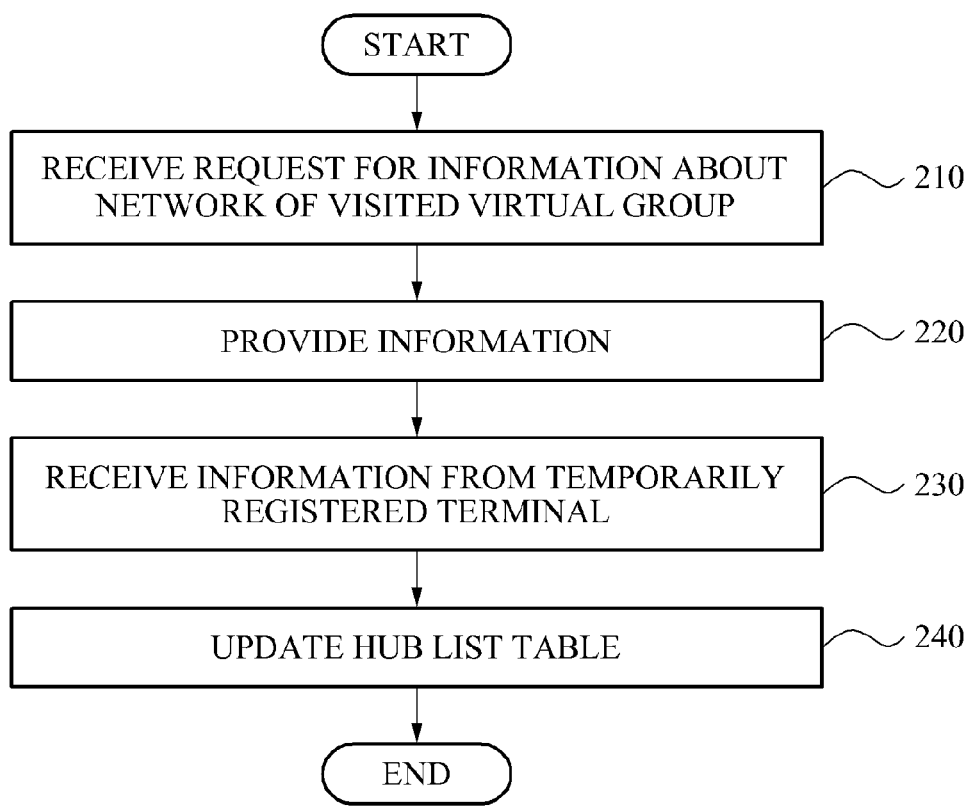
FIG. 2 is a flowchart illustrating a method of controlling a home hub in a virtual group for content sharing, according to an example embodiment.

FIG. 2 illustrates a method of controlling a home hub in a virtual group for content sharing, according to an example embodiment.

Referring to FIG. 2, in operation 210, the home hub may receive, from a terminal moving to a visited virtual group, a request for information about a network of the visited virtual group including a visited hub. In such a case, the visited hub may manage the visited virtual group.

The terminal may request information about the network of the visited virtual group using, for example, an information exchanging message being exchanged between the home hub and the terminal.

The network of the visited virtual group may include the visited hub and at least one access point managed by the visited hub, and information about the network of the visited virtual group may include information about the visited hub and information about the at least one access point managed by the visited hub.

Information about the at least one access point may include an identifier of the network of the virtual group such as an SSID and a MAC address of the at least one access point.

The identifier of the network of the virtual group may be included in an access point list that includes one or more access points belonging to the network of the virtual group.

The terminal may configure a mapping table using information about the network of the visited virtual group including the visited hub. In this described example, the visited hub manages the visited virtual group. The terminal may also recognize a new virtual group to which the terminal is moved based on the mapping table.

In operation 220, the home hub may transmit the information about the network of the visited virtual group to the terminal in response to the request from the terminal which moved to the visited virtual group.

The terminal may be temporarily registered in the visited virtual group using information about the network of the visited virtual group, and in operation 230 the home hub may receive, from the terminal, information about the visited virtual group. In this case, the terminal may be temporarily registered in the visited virtual group using information about the network of the visited virtual group received from the home hub.

The home hub may receive information about the visited virtual group which the terminal currently temporarily joins, information of the visited hub in which the terminal is currently registered, and the like.

The terminal may provide the above information to the home hub which the terminal is first registered in or joins, thereby informing the home hub that the terminal moved to another virtual group. The terminal may receive, via the home hub, a data request message to be transmitted to the terminal.

In operation 240, the home hub may update a hub list table configured in advance using information about the visited virtual group. In this example, the hub list table may be configured by hubs which manage corresponding virtual groups. The hub list table will be further described with reference to FIG. 3.

FIG. 3 illustrates a hub list table according to an example embodiment.

Referring to FIG. 3, the hub list table may include a name of a home virtual group 301, a home hub list 303 including the one or more hubs which manage the home virtual group, and at least one access point list 305 belonging to a home hub. For the sake of convenience, only one home hub is illustrated and described in this example embodiment.

The home hub list 303 may include a name 307 of the home hub and an IP address 309 of the home hub. The access point list 305 may include a name (SSID) 311 of at least one access point belonging to the home hub and an ID 313 or a MAC address of the at least one access point.

For example, it is assumed that the name of the home virtual group 301 is MyHome, the name 307 of the home hub is Hub1, and two access points such as AP1 and AP2 belong to the home hub.

In this case, the name of the home virtual group 301 in the hub list table may be MyHome, the name 307 of the home hub in the home hub list 303 may be MyHome_Hub 1, and the IP address 309 of the home hub in the home hub list 303 may be 10.0.0.1.

The name (SSID) 311 of the two access points in the access point list 305 may be MyHome_Hub1_AP_1 and MyHome_Hub1_AP_2, in association with MyHome, which is the name of the home virtual group 301, and Hub1, which is the name of the home hub, the home hub managing the home virtual group.

As described above, according to an example embodiment, an identifier of a network of a virtual group included in an access point list belonging to the network of the virtual group may be associated or mapped with the name of the home virtual group and the name of the home hub which manages the home virtual group, and thereby a geographical boundary about the virtual group may be provided.

A hub list table as described above may include not only a hub list about a single virtual group but also a hub list about a neighboring visited virtual group or another virtual group. In this case, information about each hub list may be acquired by exchanging an access point list, belonging to a network of each virtual group, between a home hub and a hub which manages the visited hub or another virtual group.

In such a case, the access point list may be associated with at least one access point belonging to the network of the virtual group.

As described above, the home hub may configure the hub list table by exchanging information, for example, the access point list about neighboring virtual groups before a terminal moves to the visited virtual group, and may update the hub list table configured in advance by receiving information about the visited virtual group as the terminal moves.

The home hub may store a list of access points physically connected to a corresponding hub when configuring the hub list. A configuration of the hub list table is described hereinafter.

The home hub may have difficulty in recognizing information about a communication environment including at least one access point in the virtual group. Therefore, when performing an association with a terminal connected to the network of the home virtual group, the home hub may acquire information about the communication environment.

For example, the home hub may perform an association with a terminal connected to at least one access point which is connected to a physical network of the home virtual group to construct a wireless environment. The home hub may acquire an identifier of the network of the home virtual group from the terminal. Accordingly, the home hub may acquire information about the communication environment in the virtual group. The identifier of to the network of the home virtual group may include an SSID and a MAC address of the at least one access point belonging to the network of the home virtual group.

To provide the home hub with the identifier of the network of the home virtual group, prior to performing the association with the home hub, the terminal may acquire the identifier of the network of the home virtual group from the network of the home virtual group.

The home hub may also acquire information about the access point, for example, an SSID and a MAC address in the virtual group by communicating with the terminal using an SMS message or an E-Mail in the virtual group.

In a case in which the terminal performs a WiFi communication, the terminal may transmit information about the access point to the home hub more easily.

The home hub may configure the access point list about the at least one access point belonging to the network of the home virtual group using the identifier of the network of the home virtual group acquired from the terminal.

The access point list configured by the home hub may include a name of the home virtual group, a name and an IP address of the home hub which manages the home virtual group, an SSID and a MAC address of the at least one access point managed by the home hub, a name of the content belonging to the at least one access point, and information about a geographical location of the hub, etc.

The home hub may exchange an access point list with a hub of the visited virtual group or another virtual group outside the home virtual group. The home hub may receive an access point list about at least one access point belonging to the network of the visited virtual group managed by the visited hub, in exchange for the access point list about the at least one access point belonging to the network of the home virtual group managed by the home hub.

Each of the home hub and the visited hub may configure the hub list table of FIG. 3 to based on the access point lists exchanged with each other.

Figure 4:
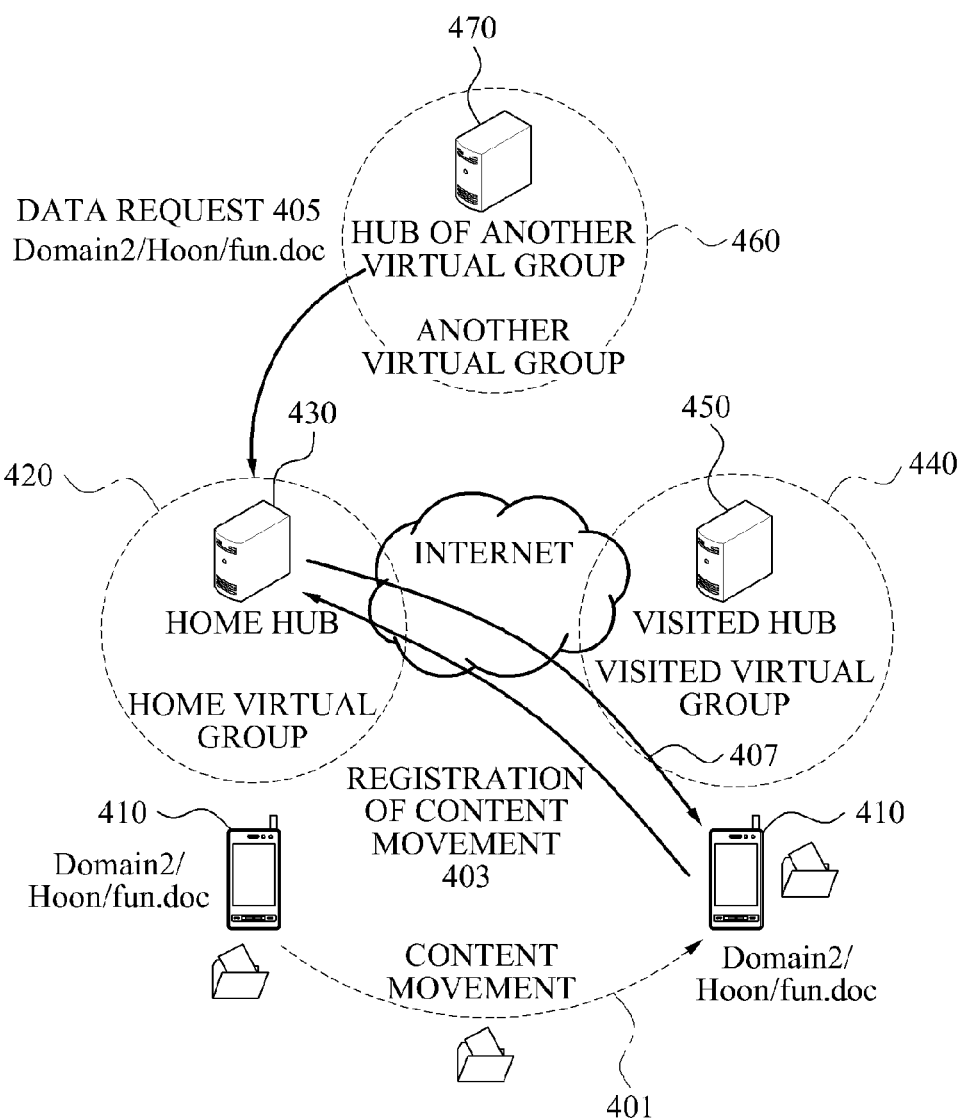
FIG. 4 is a diagram illustrating a data request from another virtual group, according to an example embodiment.

FIG. 4 illustrates a data request from another virtual group, according to an example embodiment.

Referring to FIG. 4, in a case in which a terminal 410 belonging to a home virtual group 420 is moved to a visited virtual group 440 to share content with a terminal belonging to the visited virtual group 440 or with a visited hub 450, data about content of the terminal 410 belonging to the home virtual group 420 may be requested from a hub 470 which manages another virtual group 460.

In this example embodiment, it is assumed that a name of the home virtual group 420 is Domain 2, a name of a home hub 430 is Hoon, and a name of content included in the home hub 430 and to be shared is fun.doc.

For example, in a case in which the terminal 410 having the content Domain2/Hoon/fun.doc to be shared moves to the visited virtual group 440 as indicated by a dotted arrow indicator 401, the terminal 410 may request, from the home hub 430, information about a network of the visited virtual group 440 including the visited hub 450, and may receive the information. In this example embodiment, the visited hub 450 may manage the visited virtual group 440 to which the terminal 410 has moved. Through this action, the terminal 410 may be temporarily registered in the visited virtual group 440.

As indicated by a solid arrow indicator 403, the terminal 410 may transmit, to the home hub 430 of the home virtual group 420 which the terminal 410 first joined, information about the visited virtual group 440 which the terminal 410 newly joined, thereby registering the move of the terminal 410 in the home hub 430. In this case, information about the visited virtual group 440 may include information about the visited virtual group 440 and information about the visited hub 450 to which the terminal 410 is newly registered.

Information about a virtual group, that is, the visited virtual group 440 to which the terminal 410 has moved, may be transmitted only to the home hub 430, and may not be transmitted to remaining hubs of other virtual groups.

As indicated by a solid arrow indicator 405, a content request message about the terminal 410 may be transmitted from another virtual group 460 excluding the visited virtual group 440 only to the home hub 430. As indicated by a solid arrow indicator 407, when the home hub 430 receives the content request message about the content Domain2/Hoon/fun.doc of the terminal 410 from the another virtual group 460 excluding the visited virtual group 440, more specifically, from the hub 470, the home hub 430 may inform the terminal 410 of the content request.

According to an example embodiment, an optimum routing for a data request message from the another virtual group 460 may be supported by the above procedure in response to the terminal 410 having content moving.

Figure 5:
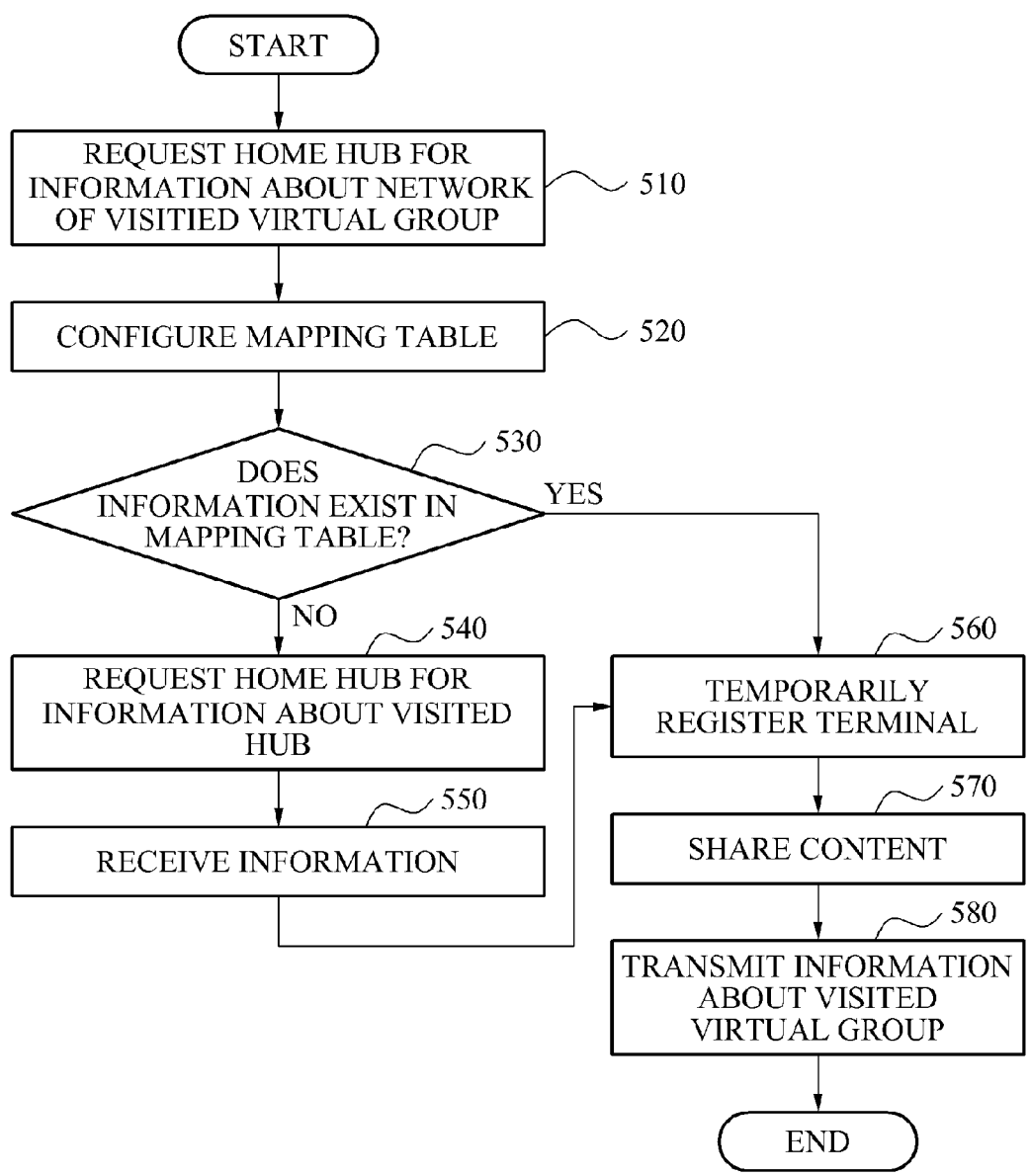
FIG. 5 is a flowchart illustrating a method of controlling a terminal in a virtual group for content sharing, according to an example embodiment.

FIG. 5 illustrates a method of controlling a terminal in a virtual group for content sharing, according to an example embodiment.

Referring to FIG. 5, in operation 510, a terminal may request, from a home hub, information about a network of a visited virtual group including a visited hub which manages the visited virtual group to which the terminal has moved. In this described example embodiment, the home hub manages a home virtual group.

In operation 520, the terminal may configure a mapping table using information about the network of the visited virtual group received in response to the request.

Information about the network of the visited virtual group may include information about the visited hub which manages the visited virtual group and at least one access point managed by the visited hub.

In operation 530, the terminal may verify whether information about the network of the visited virtual group exists in the mapping table. In operation 560, when information about the network of the visited virtual group exists in the mapping table, the terminal may perform a temporary registration in the visited virtual group based on the mapping table.

In operation 560, information about the network of the visited virtual group may be, for example, information about a name (SSID) of the at least one access point belonging to the network of the visited virtual group to which the terminal may be connected, and information about the visited hub which manages the access point.

After the temporary registration, in operation 570, the terminal may share content with the visited hub of the visited virtual group, and in operation 580, the terminal may transmit information about the visited virtual group to the home hub.

In a case in which it is determined that information about the network of the visited virtual group does not exist in the mapping table in operation 530, the terminal may request the home hub for information about the visited hub in operation 540, and after receiving information about the visited hub in operation 550, the following operations 560 through 580 may be performed.

Depending on an example embodiment, the terminal which moved to a visited virtual group may directly recognize a terminal which belongs to the visited virtual group.

In this case, the terminal which moved to the visited virtual group may directly request the terminal of the visited virtual group for information about a network of the visited virtual group, such as information about an access point and a visited hub.

Therefore, the terminal which moved to the visited virtual group may be temporarily registered in the visited virtual group based on information about the network of the visited virtual group without an operation of configuring the mapping table.

In such a case, the home hub may have difficulty in recognizing information about a communication environment including at least one access point in the virtual group. Therefore, as described above, the terminal may provide the home hub with an identifier of a network of the home virtual group when performing an association with the home hub. The identifier may be received from the network of the home virtual group.

Figure 6:
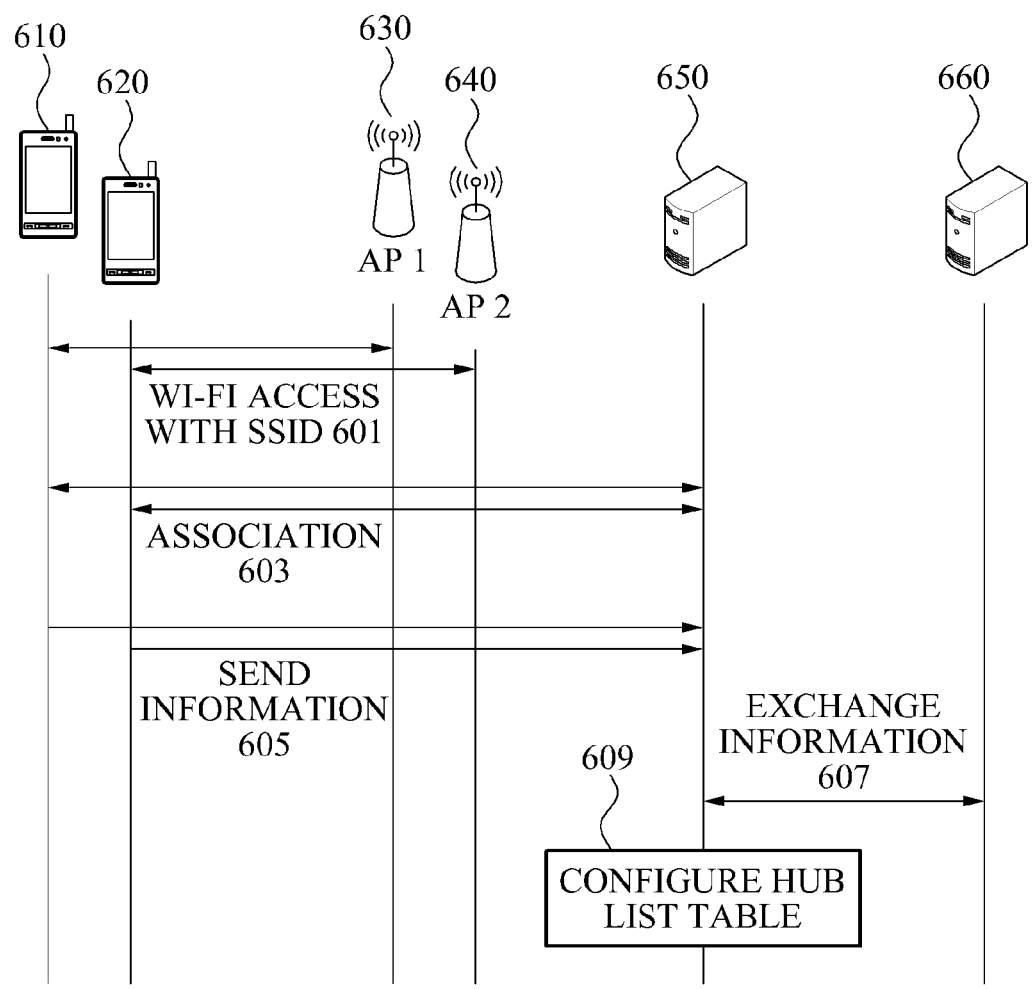
FIG. 6 is a diagram illustrating a flow of operations among a terminal, a home hub, and a visited hub, according to an example embodiment.

FIG. 6 illustrates a flow of operations among a terminal, a home hub, and a visited hub, according to an example embodiment.

Referring to FIG. 6, in operation 601, each of terminals 610 and 620 of a home virtual group may acquire an identifier of a network of the home virtual group from the network of the home virtual group. In such a case, the network of the home virtual group may include at least one access point, for example, AP1 630 and AP2 640 belonging to the network of the home virtual group, and the identifier of the network of the home virtual group may include, for example, an SSID and a MAC address of the at least one access point, for example, AP1 630 and AP2 640.

In operation 603, each of the terminals 610 and 620 may perform an association with a home hub 650. In operation 605, each of the terminals 610 and 620 may transmit, to the home hub 650, the identifier of the network of the home virtual group such as an SSID and a MAC address of the at least one access point, for example, AP1 630 and AP2 640.

In operation 607, the home hub 650 may exchange access point lists about the at least one access point belonging to the network of each virtual group with a visited hub 660 or a hub which manages another virtual group. As previously noted, the term "visited hub" refers to a hub of another virtual group to which a terminal visits or may visit simply to differentiate that hub from a home hub, and therefore does not necessarily indicate that the hub has been previously visited.

For example, the home hub 650 and the visited hub 660 may exchange an access point list, about the at least one access point, for example, AP1 630 and AP2 640 belonging to the network of the home virtual group managed by the home hub 650 located outside the visited virtual group, with an access point list about the at least one access point belonging to the network of the visited virtual group managed by the visited hub 660.

In operation 609, the home hub 650 may configure a hub list table based on the at least one access point list belonging to the network of the visited virtual group acquired through the exchange of operation 607. Content of the access point list about the at least one access point belonging to the network of the home virtual group may also be included in the hub list table managed by the home hub.

Figure 7:
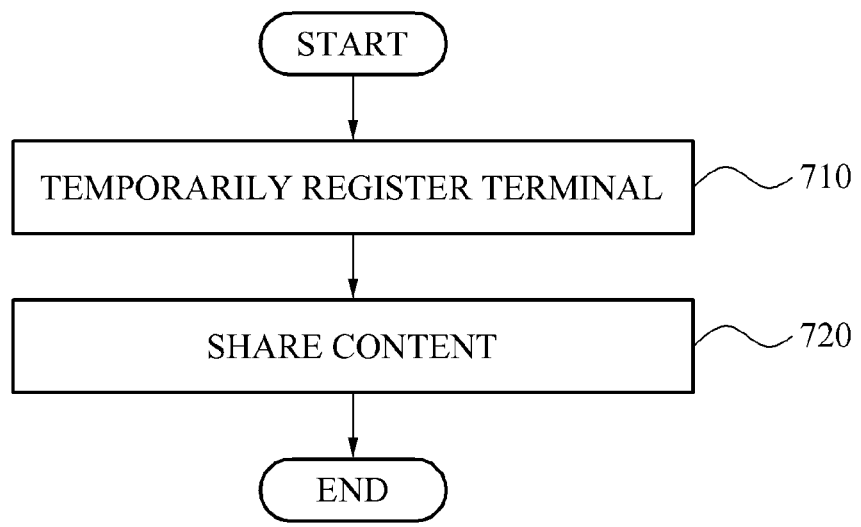
FIG. 7 is a flowchart illustrating a method of controlling a visited hub in a virtual group for content sharing, according to an example embodiment.

FIG. 7 is a flowchart illustrating a method of controlling a visited hub in a virtual group for content sharing according to an example embodiment.

Referring to FIG. 7, a visited hub in a visited virtual group for content sharing may temporarily register a terminal moved from an outer virtual group in the visited virtual group in operation 710, and may share content with the temporarily registered terminal in operation 720.

Before temporarily registering and sharing, as illustrated in FIG. 6, the visited hub may exchange, for an access point list about at least one access point belonging to a network of a home virtual group managed by a home hub located outside the visited virtual group and to which the terminal was previously registered, an access point list about at least one access point belonging to a network of the visited virtual group managed by the visited hub.

Through the above exchange of information, the visited hub may acquire the access point list about at least one access point belonging to the network of the home virtual group. The visited hub may configure a hub list table based on the access point list about the at least one access point belonging to a network of the home virtual group managed by the home hub, and the access point list about the at least one access point belonging to a network of the visited virtual group managed by the visited hub.

Content of the access point list about the at least one access point belonging to the network of the visited virtual group may also be included in the hub list table configured by the visited hub.

In this case, the hub list table configured by the visited hub may include a name of the visited virtual group, a visited hub list managing the visited virtual group, and at least one access point list belonging to the visited hub.

The visited hub list may include a name of the visited hub and an IP address of the visited hub, and the at least one access point list may include an SSID and a MAC address of the at least one access point belonging to the visited hub.

The visited hub list may include a name of the home hub and an IP address of the home hub, and the at least one access point list may include an SSID and a MAC address of the at least one access point belonging to the home hub.

The hub list table configured by the home hub may also include similar content.

The processes, functions, methods and/or software described above including a method controlling a home hub in a virtual group for content sharing may be recorded, stored, or fixed in one or more non-transitory computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to to perform the operations and methods described above, or vice versa. In addition, a non-transitory computer-readable storage medium may be distributed among computer systems connected through a network and non-transitory computer-readable codes or program instructions may be stored and executed in a decentralized manner.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of controlling a home hub in a virtual group for content sharing, the method comprising:
receiving, from a terminal moving to a visited virtual group, a request for information of a network of the visited virtual group comprising a visited hub that manages the visited virtual group;
transmitting the information of the network of the visited virtual group to the terminal in response to the request;
receiving, from the terminal, information of the visited virtual group in response to the terminal being temporarily registered in the visited virtual group using the information of the network of the visited virtual group; and
updating a hub list table configured in advance, using the information of the visited virtual group, the hub list table comprising a name of the visited virtual group, a name of the visited hub, and an identifier of the network of the visited virtual group.

2. The method of claim 1, wherein:
the network of the visited virtual group comprises the visited hub and at least one access point managed by the visited hub; and
the information of the network of the visited virtual group comprises information of the visited hub, and information of the at least one access point managed by the visited hub.

3. The method of claim 1, further comprising:
performing an association with the terminal connected to a network of a home virtual group managed by the home hub; and
acquiring an identifier of the network of the home virtual group from the terminal.

4. The method of claim 3, further comprising:
configuring an access point list comprising at least one access point belonging to the network of the home virtual group, using the identifier of the network of the home virtual group.

5. The method of claim 4, further comprising:
exchanging another access point list comprising at least one access point belonging to the network of the visited virtual group managed by the visited hub, with the access point list comprising the at least one access point belonging to the network of the home virtual group managed by the home hub; and
configuring the hub list table based on the other access point list comprising the at least one access point belonging to the network of the visited virtual group that is acquired through the exchanging.

6. The method of claim 5, wherein the configuring of the hub list table comprises associating the identifier of the network of the home virtual group comprised in the access point list comprising the at least one access point belonging to the network of the home virtual group with a name of the home virtual group and a name of the home hub managing the home virtual group, so as to provide a geographical boundary of the home virtual group.

7. The method of claim 5, wherein the hub list table further comprises a name of the home virtual group, a name and an internet protocol address of the home hub managing the home virtual group, a service set identifier and a media access control address of the at least one access point belonging to the network of the home virtual group managed by the home hub, a name of content belonging to the at least one access point belonging to the network of the home virtual group, and information of a geographical location of the home hub.

8. The method of claim 1, wherein:
the hub list table further comprises a name of a home virtual group, a home hub list comprising the home hub managing the home virtual group, and an access point list comprising at least one access point managed by the home hub;
the home hub list comprises a name of the home hub and an internet protocol address of the home hub; and
the access point list comprises a service set identifier and a media access control address of the at least one access point managed by the home hub.

9. The method of claim 1, further comprising:
informing the terminal of a content request in response to the content request being received from other virtual groups excluding the visited virtual group, the content request being of the terminal.

10. A method of controlling a terminal in a virtual group for content sharing, the method comprising:
requesting a home hub for information of a network of a visited virtual group comprising a visited hub that manages the visited virtual group to which the terminal moves, the home hub managing a home virtual group;
configuring a mapping table using the information of the network of the visited virtual group received in response to the request;
performing a temporary registration in the visited virtual group based on the mapping table;
sharing content with the visited hub; and
transmitting information of the visited virtual group to the home hub, the information of the visited virtual group comprising a name of the visited virtual group, a name of the visited hub, and an identifier of the network of the visited virtual group.

11. The method of claim 10, further comprising:
acquiring an identifier of a network of the home virtual group from the network of the home virtual group;
performing an association with the home hub; and
transmitting the identifier of the network of the home virtual group to the home hub.

12. The method of claim 10, further comprising:
requesting the home hub for the information of the network of the visited virtual group in response to the information of the network of the visited virtual group not existing in the mapping table.

13. A method of controlling a visited hub in a virtual group for content sharing, the method comprising:
performing a temporary registration of a terminal moving to a visited virtual group;
sharing content with the temporarily registered terminal;
exchanging an access point list comprising at least one access point belonging to a network of a home virtual group managed by a home hub located outside the visited virtual group, with another access point list comprising at least one access point belonging to a network of the visited virtual group managed by the visited hub; and
configuring a hub list table to comprise the access point list comprising the at least one access point belonging to the network of the home virtual group that is acquired through the exchanging, the hub list table further comprising a name of the home virtual group and a name of the home hub.

14. The method of claim 13, wherein:
the hub list table further comprises a name of the visited virtual group, a visited hub list comprising the visited hub that manages the visited virtual group, and the other access point list comprising the at least one access point belonging to the network of the visited virtual group managed by the visited hub;
the visited hub list comprises a name of the visited hub and an internet protocol address of the visited hub; and
the other access point list comprises a service set identifier and a media access control address of the at least one access point belonging to the network of the visited virtual group managed by the visited hub.

15. The method of claim 1, wherein the hub list table further comprises an internet protocol address of the visited hub.

16. The method of claim 1, wherein the identifier of the network of the visited virtual group comprises a service set identifier and a media access control address of an access point of the visited virtual group.

17. The method of claim 10, wherein the information of the visited virtual group further comprises an internet protocol address of the visited hub.

18. The method of claim 10, wherein the identifier of the network of the visited virtual group comprises a service set identifier and a media access control address of an access point of the visited virtual group.

19. The method of claim 13, wherein the hub list table further comprises an internet protocol address of the home hub.

20. The method of claim 13, wherein the access point list comprises a service set identifier and a media access control address of the at least one access point belonging to the network of the home virtual group.

* * * * *